United States Patent
Guo (10) Patent No.: US 11,366,376 B2
(45) Date of Patent: Jun. 21, 2022

(54) HIGH-EFFICIENCY ILLUMINATION SYSTEM FOR LCD PROJECTOR AND PROJECTION METHOD THEREOF

(71) Applicant: NANHUA INTELLIGENT PRECISION MACHINE (SHENZHEN) CO., LTD., Guangdong (CN)

(72) Inventor: Hanwen Guo, Guangdong (CN)

(73) Assignee: NANHUA INTELLIGENT PRECISION MACHINE (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 17/139,586

(22) Filed: Dec. 31, 2020

(65) Prior Publication Data

US 2021/0124248 A1 Apr. 29, 2021

(30) Foreign Application Priority Data

Nov. 4, 2020 (CN) .......................... 202011220123.8

(51) Int. Cl.
*G03B 21/14* (2006.01)
*G03B 21/20* (2006.01)
*G03B 21/00* (2006.01)

(52) U.S. Cl.
CPC ....... *G03B 21/2033* (2013.01); *G03B 21/006* (2013.01); *G03B 21/2053* (2013.01); *G03B 21/2073* (2013.01)

(58) Field of Classification Search
CPC .......................... G03B 21/14; G03B 21/2033; G03B 21/2073; G03B 21/2053; G03B 21/006; F21V 9/00; F21V 9/14
See application file for complete search history.

(56) References Cited

U.S. PATENT DOCUMENTS

| 8,770,763 | B2 * | 7/2014 | Murayama | G02B 27/48 353/38 |
| 2007/0146639 | A1 * | 6/2007 | Conner | H04N 9/3167 353/20 |
| 2020/0341353 | A1 * | 10/2020 | Guo | G03B 21/2033 |
| 2020/0382751 | A1 * | 12/2020 | Guo | G03B 21/2073 |
| 2020/0401024 | A1 * | 12/2020 | Guo | G02F 1/13306 |
| 2021/0109431 | A1 * | 4/2021 | Guo | G03B 21/2033 |
| 2021/0109434 | A1 * | 4/2021 | Guo | G03B 21/006 |
| 2021/0120215 | A1 * | 4/2021 | Guo | G03B 21/006 |
| 2021/0124242 | A1 * | 4/2021 | Guo | G03B 21/2033 |
| 2021/0240060 | A1 * | 8/2021 | Guo | G03B 21/006 |

* cited by examiner

*Primary Examiner* — William C. Dowling (57) ABSTRACT

A high-efficiency lighting system for an LCD projectors, comprises an LED light source, a condensing device, a collimator lens, a quarter wave plate, and a brightness enhancement type polarizer, an LCD light valve, a field lens and projection lens which are provided in sequence according to a direction of a light travel; wherein the LED light source comprises a thermally conductive substrate, and a light-emitting area is provided on the thermally conductive substrate, a plurality of light-emitting chips are provided on the light-emitting area, and a gap is provided between two adjacent light-emitting chips; a reflective film for reflecting light is provided on an area which is in the light-emitting area and outside the light-emitting chips. The present invention achieves a significant improvement in the lighting efficiency of the projector, and outputs the same brightness.

7 Claims, 6 Drawing Sheets

| Error estimate | | | | |
|---|---|---|---|---|
| Peak | 8.31 % | Average | 9.74 % | |

| Sample number (N) | 66,564 | | | |
|---|---|---|---|---|

Total luminous flux(Not smoothed)

| Unit (U) | Lumen | | | |
|---|---|---|---|---|
| Incident | 7180.3 Lumen | Limited by aperture (P) | | |
| Absorbed (B) | 7180.3 Lumen | 0.00000 Lumen | | |

Statistics based on smoothed network data

Illuminance

| Min (M) | 8.9524e+005 Lux | Contrast (C) | 0.31607 |
|---|---|---|---|
| Max(X) | 1.3378e+006 Lux | Standard deviation (D) | 87362. |
| Ave (A) | 1.1634e+006 Lux | Average deviation(V) | 0.073094 |

Distribution position and extended width

| Centroid | | Standard deviation | |
|---|---|---|---|
| X | 0.061793 mm | Sigma X | 29.803 mm |
| Y | 0.038120 mm | Sigma Y | 17.081 mm |

Fig. 6

HIGH-EFFICIENCY ILLUMINATION SYSTEM FOR LCD PROJECTOR AND PROJECTION METHOD THEREOF

CROSS REFERENCE OF RELATED APPLICATION

The present application claims priority under 35 U.S.C. 119(a-d) to CN 202011220123.8, filed Nov. 4, 2020.

BACKGROUND OF THE PRESENT INVENTION

Field of Invention

The present invention relates to the field of projectors, and more particular to a high-efficiency illumination system for an LCD projector and a projection method thereof.

Description of Related Arts

For a long time, since the transmissive single LCD projector is based on illuminating its liquid crystal molecules with online polarized light, so as to produce bright and dark images through the analyzer, and the illuminating light from the light source can almost be regarded as natural light. During the polarization process, about ≥50% of the light is filtered by the polarizer of the LCD light valve. Considering the extinction ratio of the LCD light valve on the polarizer, the total polarization efficiency of the polarizer is often ≤38%-45%. This lighting loss alone will cause 55%-62% of the energy of a single LCD projector to do useless work, which fundamentally affects the efficiency of the optical system of a single LCD projector, and fundamentally increases the projector. The heat dissipation burden of the optical system fundamentally limits the performance and application of a single LCD projector.

The problem to be solved by the present invention is to explore and invent an efficiency improvement solution that is easy to manufacture, inexpensive and good-quality, so that a single LCD projector has higher performance and broader application prospects.

SUMMARY OF THE PRESENT INVENTION

In order to solve the above technical problems, the purpose of the present invention is to provide a high-efficiency lighting system for LCD projectors that can be easily manufactured and is inexpensive and good-quality.

The technical solutions provided by the present invention are as follows:

A high-efficiency lighting system for an LCD projectors, comprises an LED light source, a condensing device, a collimator lens, a quarter wave plate, and a brightness enhancement type polarizer, an LCD light valve, a field lens and projection lens which are provided in sequence according to a direction of a light travel; wherein the LED light source comprises a thermally conductive substrate, and a light-emitting area is provided on the thermally conductive substrate, a plurality of light-emitting chips are provided on the light-emitting area, and a gap is provided between two adjacent light-emitting chips; a reflective film for reflecting light is provided on an area which is in the light-emitting area and outside the light-emitting chips.

Further, the brightness-enhancing polarizer is a linear polarizer, and a transmission axis of the brightness-enhancing polarizer consists with a polarization plane of an incident polarized light required by the LCD light valve, the brightness-enhancing polarizer transmits a linearly polarized light required by the LCD light valve; a reflection axis of the type polarizer is orthogonal to the transmission axis of the type polarizer, and the brightness enhancement polarizer reflects a linearly polarized light orthogonal to the polarization plane of the transmission axis.

Further, a fast axis of the quarter wave plate and the transmission axis of the brightness-enhancing polarizer are aligned with an angle of +45°, −45°, +135°, or −135°.

Further, the quarter wave plate comprises two pieces of one eighth wave plate, the two pieces of one eighth wave plate are combined to form an equivalent fast axis, and the equivalent fast axis of the wave plate combination and the transmission axis of the brightness-enhancing polarizer form an angle of +45°, −45°, +135° or −135°.

Further, the condensing device is a square cone condenser, a CPC condenser, or a condenser lens.

The present invention also provides a projection method for the high-efficiency lighting system for the LCD projector comprises steps of: emitting light by the LED light source, collecting by the light collecting device, collimating by the collimating lens, and then passing through the quarter wave plate to reach the increasing bright polarizer, separating the light by polarized light by the brightness-enhancing polarizer, and transmitting the polarized light that is useful to the LCD light valve, and reflecting the polarized light that is useless to the LCD light valve; wherein the two polarized lights are linearly polarized light with equal amplitude and orthogonal vibration planes; one polarized light useful for the LCD light valve passes through the LCD light valve, and then passes through the field lens and the projection lens to be projected outside; the polarized light that is useless to the LCD light valve is reflected back by the brightness-enhancing polarizer, and the reflected light passes through the quarter wave plate to be focused by the collimating lens and collected by the condensing device, the light reflected is focused and irradiated on the light-emitting area of the LED light source, wherein a first part of the light is reflected by the reflective film, and then collected by the light collecting device, collimated by the collimating lens, and then passed through the quarter wave plate to reach the brightness enhancement polarizer, the light reflected passes through the quarter wave plate twice, and the polarization plane is rotated by 90° to become consistent with the transmission axis of the brightness enhancement polarizer, therefore, a second part of the polarized light that is useless to the LCD light valve becomes available, and a process of polarization conversion is completed.

The beneficial effects of the present invention are as follows.

The LED light source of the present invention includes a suitable gap when the light-emitting chips are arranged, and the reflective film is made on the heat-conducting substrate included in the LED light source, and the brightness-enhancing polarizer separates natural light by polarizing light, and the separation is useful and useless for LCD light valves When the two paths of polarized light are used, the useless path of polarized light will be reflected back and a part of it will illuminate on the reflective film, and it will be reflected back by the reflective film to enter the condenser again. The light spread (optical extension) will not cause obvious overflow, and at the same time This useless path of polarized light passes through the quarter-wave plate twice in a row and then the polarization plane is rotated by 90°, making part of the polarization of this path useless for the LCD light valve available, so the projector's illuminating efficiency is significantly improved. The brightness is greatly improved, and the same brightness is output compared with the prior art. The present invention can greatly save power consumption and actively help reduce projector volume, noise, heat dissipation, cost and other aspects of production and user experience.

These and other objectives, features, and advantages of the present invention will become apparent from the following detailed description, the accompanying drawings, and the appended claims.

BRIEF DESCRIPTION OF THE DRAWINGS

In order to explain the embodiments of the present invention or the technical solutions in the prior art more clearly, the following will briefly introduce the drawings that need to be used in the description of the embodiments or the prior art. Obviously, the drawings in the following description are only some of the preferred embodiments described in the present invention. For those of ordinary skill in the art, other drawings can be obtained based on these drawings without creative work.

DETAILED DESCRIPTION OF THE PREFERRED EMBODIMENT

In order to enable those skilled in the art to better understand the technical solutions of the present invention, the present invention will be described in detail below with reference to the accompanying drawings. The description in this section is only exemplary and explanatory, and should not have any limiting effect on the protection scope of the present invention.

It should be noted that similar reference numerals and letters indicate similar items in the following drawings. Therefore, once an item is defined in one drawing, it does not need to be further defined and explained in the subsequent drawings.

It should be noted that the terms "center", "upper", "lower", "left", "right", "vertical", "horizontal", "inner", "outer", etc. indicate the orientation or positional relationship: Based on the orientation or position relationship shown in the drawings, or the orientation or position relationship usually placed when the product of the invention is used, it is only for the convenience of describing the present invention and simplifying the description, and does not indicate or imply that the device or element referred to must It has a specific orientation, is constructed and operated in a specific orientation, and therefore cannot be understood as a limitation to the present invention. In addition, the terms "first", "second", "third", etc. are only used for distinguishing description, and cannot be understood as indicating or implying relative importance.

In addition, the terms "horizontal", "vertical", "overhanging" and other terms do not mean that the component is required to be absolutely horizontal or overhanging, but may be slightly inclined. For example, "horizontal" only means that its direction is more horizontal than "vertical", it does not mean that the structure must be completely horizontal, but can be slightly inclined.

In the description of the present invention, it should also be noted that, unless otherwise clearly specified and limited, the terms "set", "install", "connected", and "connected" should be understood in a broad sense. For example, they may be fixed connections. It can also be detachably connected or integrally connected; it can be mechanically connected or electrically connected; it can be directly connected or indirectly connected through an intermediate medium, and it can be the internal communication between two components. For those of ordinary skill in the art, the specific meanings of the above-mentioned terms in the present invention can be understood in specific situations.

Embodiment

As shown in FIGS. 1-6, the LCD projector high-efficiency lighting system provided by this embodiment includes an LED light source 1, a condensing device 2, a collimating lens 3, a quarter wave plate 4, Brightness-enhancing polarizer 5, LCD light valve 6, field lens 7 and projection lens 8.

Figure 1:
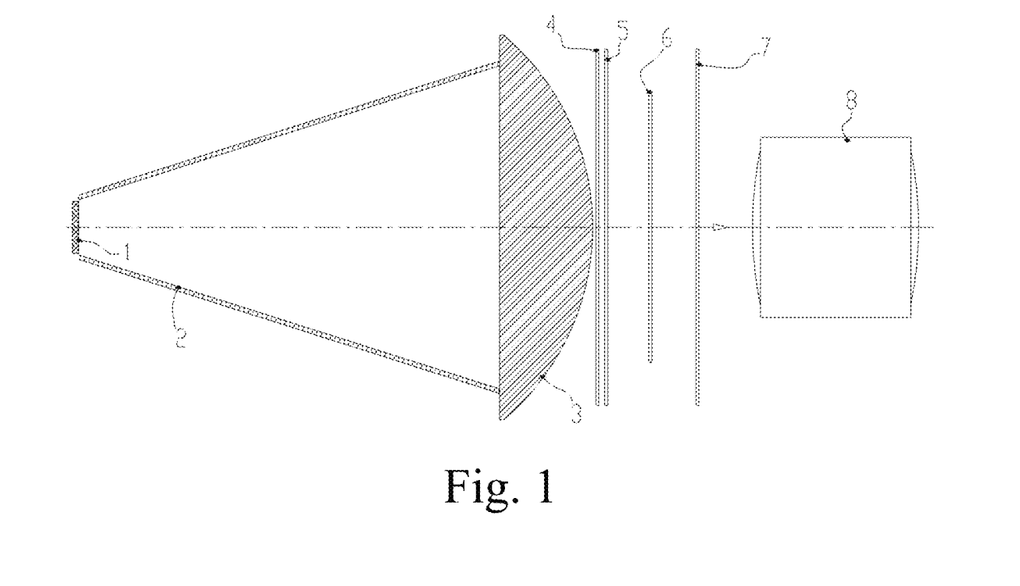
FIG. 1 is a schematic structural diagram of an embodiment of the present invention.

In this embodiment, the condensing device 2 is a hollow square conical concentrator.

The brightness-enhancing polarizer 5 can be equivalent to a flat beam splitter to split natural light (equivalent to two linearly polarized lights with equal amplitude and orthogonal vibration planes), that is, to achieve the transmission and Reflect, produce the effect of light splitting.

Figure 2:
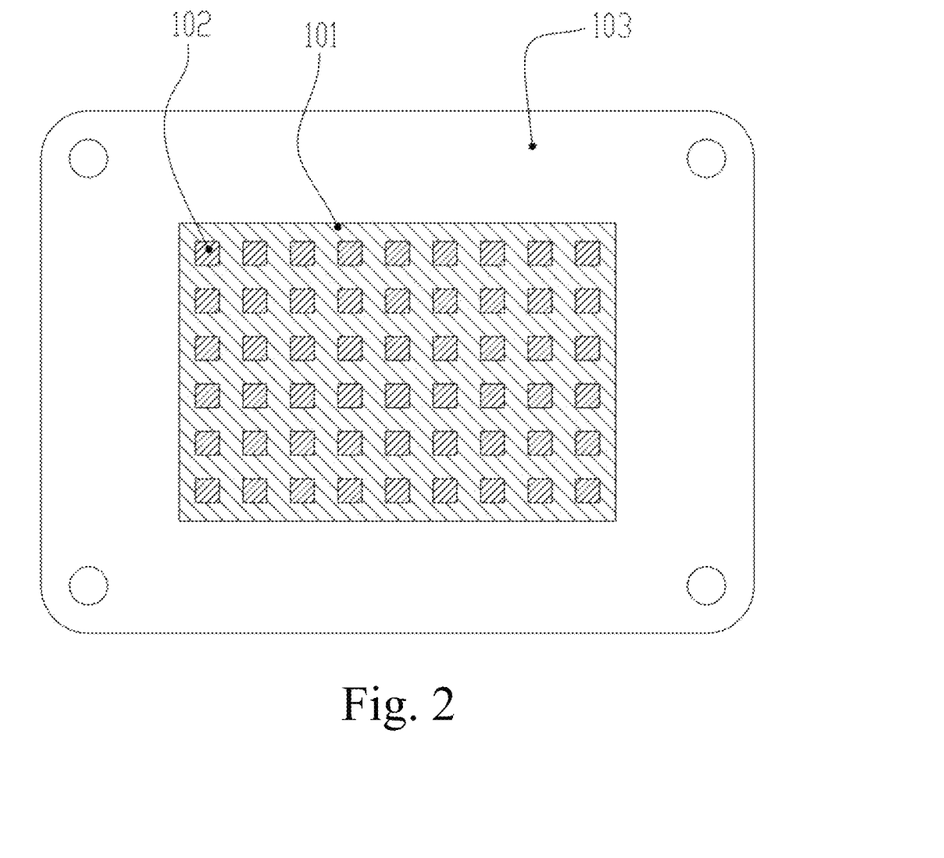
FIG. 2 is a schematic diagram of the arrangement of light-emitting chips of the LED light source of the present invention.
Figure 4:
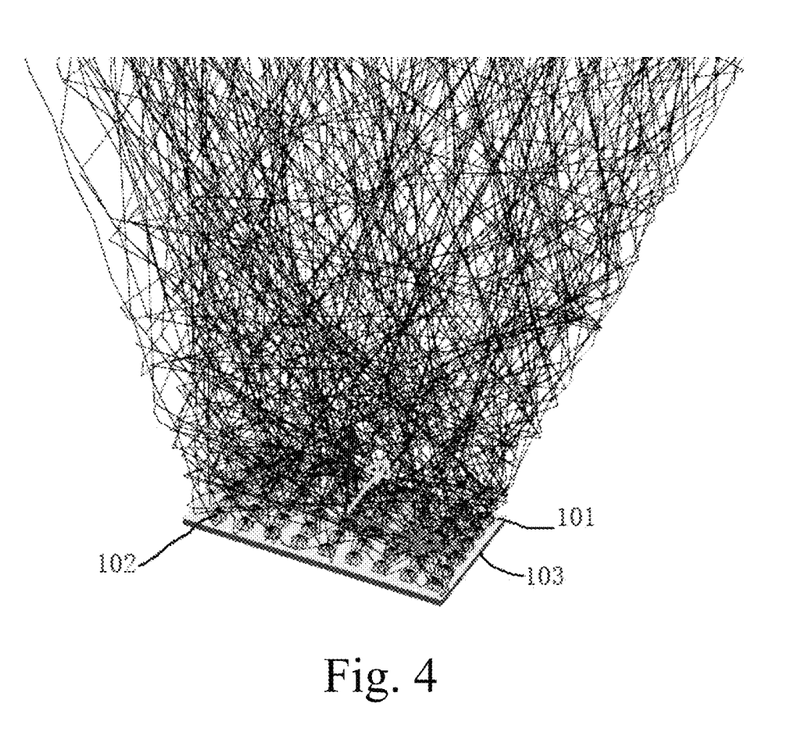
FIG. 4 is a partial schematic diagram of ray tracing according to an embodiment of the present invention.

Refer to FIG. 1-2 and FIG. 4, when the professional software simulation is performed in this embodiment, the light-emitting area size of the LED light source 1 is set to 18.36×10.56 mm, 45 pieces of 40 mil light-emitting chips 102 are uniformly distributed, and the total luminous flux is 9018 Lm (lumens); Optical device 2 uses a hollow square conical condenser, the size of the entrance port is 18.36×10.56 mm, the size of the exit port is 107.6×63.6 mm, the length along the optical axis is 140 mm, and the reflectivity of the inner wall is 100%; collimating lens 3 is set as a plano-convex lens with a center thickness of 32, the material is QK2 (China), the convex spherical radius is 82.65, and the convex faces the LCD light valve 6; the quarter-wave plate 4 and the brightness enhancement polarizer 5 are integrated in a piece of thickness 0.5 On the glass, glass material K9L (China), the entrance surface of the glass is set to quarter wave plate 4, the exit surface is set to brightness-enhancing polarizer 5, and the distance between the entrance surface of the glass and the vertex of the exit surface of the collimator lens 3 is 0.1 mm, the angle between the fast axis of the quarter-wave plate 4 and the transmission axis of the brightening polarizer 5 is 45°; the LCD light valve 6 is a 4.5-inch light valve, the window size is 101*56.8 mm, and the distance from the collimator lens is 3 The apex of the exit surface is 11 mm, a "surface receiver" is placed on the incident surface of the LCD light valve 6, and an "angle luminance meter" is placed on the "surface receiver". The effectiveness of this implementation is shown in Table 1 below:

TABLE 1

Effect of the Embodiment

| No. | Condition setting | Light illuminating the "surface receiver" |
|---|---|---|
| ① | FIG. 1 does not set (cancel or remove) the quarter wave plate 4 and the brightness-enhancing polarizer 5 | 7441.1 Lm (natural light, equivalent to 3720 Lm linearly polarized light) |
| ② | FIG. 1 After setting the quarter wave plate 4 and the brightness enhancement polarizer 5 | 7180.3 Lm (linearly polarized light) |

The sequence number ① in Table 1 is the prior art, and the projector output luminous flux is 325 Lm.
The number ② in Table 1 is the technology of this embodiment, and the output light of the projector is 625 Lm.

It can be seen that through this embodiment, the lighting efficiency of the projector is significantly improved (up to 1.92 times), and the same brightness is output compared with the existing technology. This embodiment can greatly save power consumption and reduce the volume and noise of the projector. Heat dissipation, cost and other aspects of production and user experience are actively helping.

Figure 3:
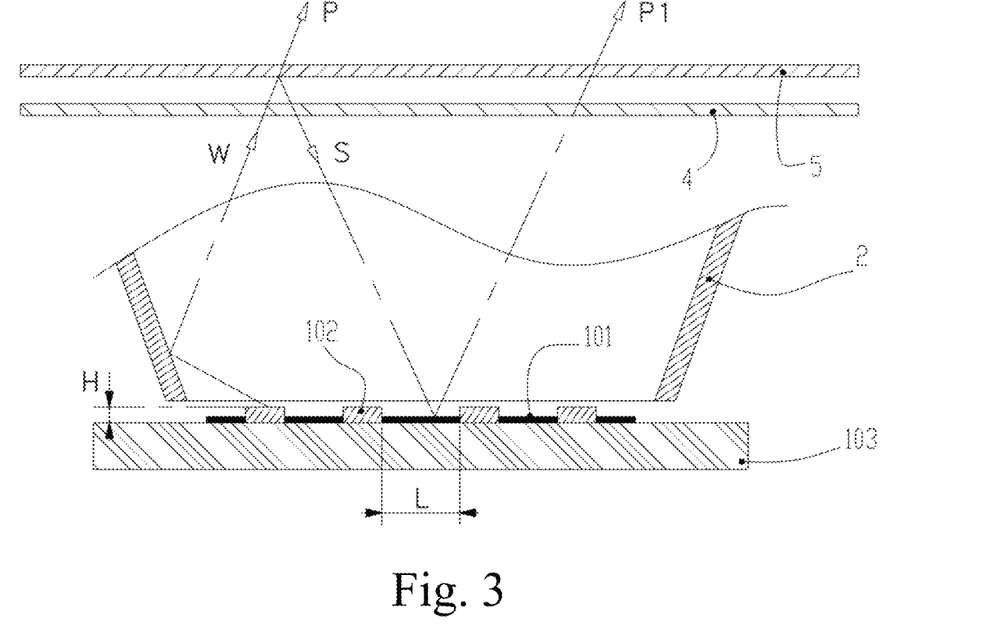
FIG. 3 is a schematic diagram of the polarization conversion process of the present invention.

FIG. 3 is a demonstration of the polarization conversion process of this embodiment. Any light W emitted from the light-emitting chip 102 arranged in the light-emitting area on the LED light source 1 passes through the condensing device 2 and passes through the quarter wave plate 4 reaches the brightness enhancement polarizer 5 and separates the polarized light. The polarized light P useful to the LCD light valve 6 is transmitted, and the polarized light S that is not useful to the LCD light valve 6 is reflected back and passes through the quarter wave plate 4, and passes through the reflective film 101 again. At this time, after the polarized light S passes through the quarter-wave plate 4 twice in succession, the polarization plane is rotated by 90° to become P1, so that it passes through the brightness-enhancing polarizer 5 for the LCD light valve 6 to use.

Since any position of the light-emitting area on the LED light source 1 satisfies the light spread of the system, even if the light is reflected by the reflective film 101 and enters the condenser 2 again and reaches the LCD light valve 6, the light spread does not significantly overflow. So it can be used by the system.

In FIG. 3, the gap between the light-emitting chips 102 is L, and the thickness of the light-emitting chip is H. In this embodiment, when L/H≥1.666 times, a higher efficiency improvement can be obtained, and the light-emitting chip of this embodiment Arrangement, L/H is about 4.24. The choice of the gap size L, in addition to having a certain relationship with H, must also be combined with the desired luminous flux output by the LED light source 1, the luminous flux required by the projector, and the limitations of the projector lens 8 and LCD light valve 6 on the light-emitting area of the light source. Combining the length and width dimensions, efficiency, etc. of the light-emitting chip 102, it is economical, efficient, and reasonable. For example, in the defined light-emitting area, the number of light-emitting chips 102 is arranged much, the total luminous flux of the LED light source 1 is large, but the polarization conversion efficiency is low, the projector output brightness is high, and the energy consumption is high; while the number of light-emitting chips 102 are arranged properly, the total luminous flux of the LED light source 1 may be much smaller, but the polarization conversion efficiency is high, the projector output brightness is high, and the energy consumption and cost are much lower.

FIG. 4 is a partial schematic diagram of ray tracing in this embodiment. In order to facilitate observation, the condensing device 2 and other raw materials are hidden in the figure, and only the LED light source 1 and about 80 tracing visible rays are retained.

Figure 5:
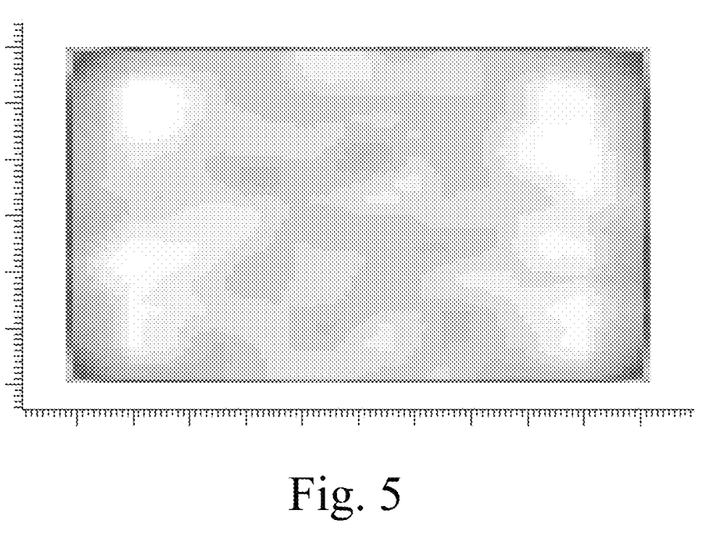
FIG. 5 is an illuminance distribution diagram on an LCD light valve according to an embodiment of the present invention.

FIG. 5 shows the illuminance distribution of the surface receiver on the incident surface of the LCD light valve 6 (approximately 4.4-4.5 inches) in this embodiment, the uniformity is very good, and the aperture angle also meets the setting requirements.

Figure 6:
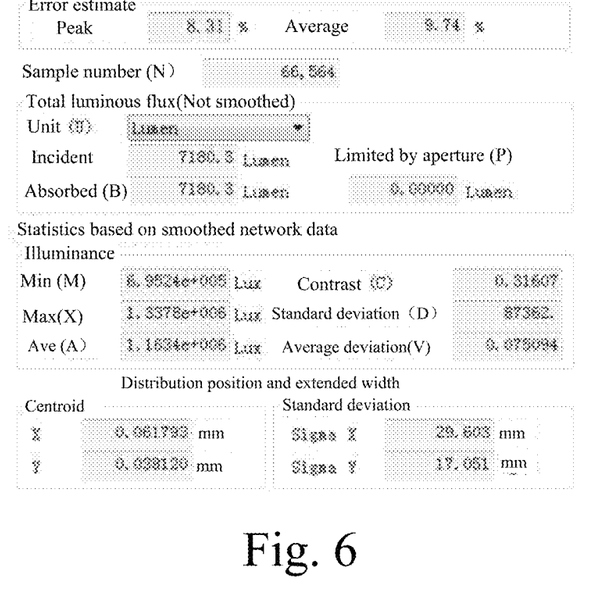
FIG. 6 shows the illuminance data on the LCD light valve according to the embodiment of the present invention.

FIG. 6 shows several typical illuminance data of the surface receiver on the incident surface of the LCD light valve 6, which can quantify the uniformity of the projection image for the illuminance distribution of FIG. 5. Usually, serious optical design and production, the actual results and the design agreement is extremely high.

It should be noted that in this article, the terms "include", "include" or any other variants thereof are intended to cover non-exclusive inclusion, so that a process, method, article or device including a series of elements not only includes those elements, It also includes other elements not explicitly listed, or elements inherent to the process, method, article, or equipment.

Specific examples are used in this article to illustrate the principle and implementation of the present invention. The description of the above examples is only used to help understand the method and core idea of the present invention. The above are only the preferred embodiments of the present invention. It should be pointed out that due to the limited expression of words, there are objectively unlimited specific structures. For those skilled in the art, without departing from the principle of the present invention, Several improvements, modifications or changes can also be made, or the above technical features can be combined in an appropriate manner; these improvements, modifications or combinations, or the concept and technical solution of the invention are directly applied to other occasions without improvement, All should be regarded as the protection scope of the present invention.

What is claimed is:

1. A high-efficiency lighting system for an LCD projectors, comprising an LED light source (1), a condensing device (2), a collimator lens (3), a quarter wave plate (4), and a brightness enhancement type polarizer (5), an LCD light valve (6), a field lens (7) and projection lens (8) which are provided in sequence according to a direction of a light travel; wherein the LED light source (1) comprises a thermally conductive substrate (103), and a light-emitting area is provided on the thermally conductive substrate (103), a plurality of light-emitting chips (102) are provided on the light-emitting area, and a gap is provided between two adjacent light-emitting chips (102); a reflective film (101) for reflecting light is provided on an area which is in the light-emitting area and outside the light-emitting chips (102);

wherein the brightness-enhancing polarizer (5) is a linear polarizer, and a transmission axis of the brightness-enhancing polarizer (5) consists with a polarization plane of an incident polarized light required by the LCD light valve (6), the brightness-enhancing polarizer (5) transmits a linearly polarized light required by the LCD light valve (6); a reflection axis of the type polarizer (5) is orthogonal to the transmission axis of the type polarizer (5), and the brightness enhancement polarizer (5) reflects a linearly polarized light orthogonal to the polarization plane of the transmission axis;

wherein a fast axis of the quarter wave plate (4) and the transmission axis of the brightness-enhancing polarizer (5) are aligned with an angle of +45°, −45°, +135°, or −135°.

2. A high-efficiency lighting system for an LCD projectors, comprising an LED light source (1), a condensing device (2), a collimator lens (3), a quarter wave plate (4), and a brightness enhancement type polarizer (5), an LCD light valve (6), a field lens (7) and projection lens (8) which are provided in sequence according to a direction of a light travel, wherein the LED light source (1) comprises a thermally conductive substrate (103), and a light-emitting area is provided on the thermally conductive substrate (103), a plurality of light-emitting chips (102) are provided on the light-emitting area, and a gap is provided between two adjacent light-emitting chips (102); a reflective film (101) for reflecting light is provided on an area which is in the light-emitting area and outside the light-emitting chips (102);

wherein the brightness-enhancing polarizer (5) is a linear polarizer, and a transmission axis of the brightness-enhancing polarizer (5) consists with a polarization plane of an incident polarized light required by the LCD light valve (6), the brightness-enhancing polarizer (5) transmits a linearly polarized light required by the LCD light valve (6); a reflection axis of the type polarizer (5) is orthogonal to the transmission axis of the type polarizer (5), and the brightness enhancement polarizer (5) reflects a linearly polarized light orthogonal to the polarization plane of the transmission axis;

wherein the quarter wave plate (4) comprises two pieces of one eighth wave plate, the two pieces of one eighth wave plate are combined to form an equivalent fast axis, and the equivalent fast axis of the wave plate combination and the transmission axis of the brightness-enhancing polarizer (5) form an angle of +45°, −45°, +135° or −135°.

3. The high-efficiency lighting system for LCD projectors according to claim 1, wherein the condensing device (2) is a square cone condenser, a CPC condenser, or a condenser lens.

4. A projection method for the high-efficiency lighting system for the LCD projector according to claim 1 comprising steps of: emitting light by the LED light source (1), collecting by the light collecting device (2), collimating by the collimating lens (3), and then passing through the quarter wave plate (4) to reach the increasing bright polarizer (5), separating the light by polarized light by the brightness-enhancing polarizer (5), and transmitting the polarized light that is useful to the LCD light valve (6), and reflecting the polarized light that is useless to the LCD light valve (6); wherein the two polarized lights are linearly polarized light with equal amplitude and orthogonal vibration planes; one polarized light useful for the LCD light valve (6) passes through the LCD light valve (6), and then passes through the field lens (7) and the projection lens (8) to be projected outside; the polarized light that is useless to the LCD light valve (6) is reflected back by the brightness-enhancing polarizer (5), and the reflected light passes through the quarter wave plate (4) to be focused by the collimating lens (3) and collected by the condensing device (2), the light reflected is focused and irradiated on the light-emitting area of the LED light source (1), wherein a first part of the light is reflected by the reflective film (101), and then collected by the light collecting device (2), collimated by the collimating lens (3), and then passed through the quarter wave plate (4) to reach the brightness enhancement polarizer (5), the light reflected passes through the quarter wave plate (4) twice, and the polarization plane is rotated by 90° to become consistent with the transmission axis of the brightness enhancement polarizer (5), therefore, a second part of the polarized light that is useless to the LCD light valve (6) becomes available, and a process of polarization conversion is completed.

5. The high-efficiency lighting system for LCD projectors according to claim 1, wherein the condensing device (2) is a hollow square conical concentrator;

wherein the brightness-enhancing polarizer (5) is equivalent to a flat beam splitter to split natural light (equivalent to two linearly polarized lights with equal amplitude and orthogonal vibration planes), that is, to achieve the transmission and Reflect, produce the effect of light splitting;

when the professional software simulation is performed, the light-emitting area size of the LED light source (1) is set to 18.36×10.56 mm, 45 pieces of 40 mil light-emitting chips (102) are uniformly distributed, and the total luminous flux is 9018Lm (lumens); the optical device (2) uses a hollow square conical condenser, the size of the entrance port is 18.36×10.56 mm, the size of the exit port is 107.6×63.6 mm, the length along the optical axis is 140 mm, and the reflectivity of the inner wall is 100%; collimating lens 3 is set as a plano-convex lens with a center thickness of 32, the material is QK2 form China, the convex spherical radius is 82.65, and the convex faces the LCD light valve (6); the quarter-wave plate (4) and the brightness enhancement polarizer (5) are integrated in a piece of thickness of 0.5, on the glass, glass material K9L from China, the entrance surface of the glass is set to quarter wave plate (4), the exit surface is set to brightness-enhancing polarizer (5), and the distance between the entrance surface of the glass and the vertex of the exit surface of the collimator lens (3) is 0.1 mm, the angle between the fast axis of the quarter-wave plate (4) and the transmission axis of the brightening polarizer (5) is 45°; the LCD light valve (6) is a 4.5-inch light valve, the window size is 101*56.8 mm, and the distance from the collimator lens is 3; the apex of the exit surface is 11 mm, a surface receiver is placed on the incident surface of the LCD light valve (6), and an angle luminance meter is placed on the "surface receiver.

6. The high-efficiency lighting system for LCD projectors according to claim 1, wherein since any position of the light-emitting area on the LED light source (1) satisfies the light spread of the system, even if the light is reflected by the reflective film (101) and enters the condenser (2) again and reaches the LCD light valve (6).

7. The high-efficiency lighting system for LCD projectors according to claim 2, wherein the gap between the light-emitting chips 102 is L, and the thickness of the light-emitting chip is H; when L/H≥1.666 times, a higher efficiency improvement is obtained, and the light-emitting chip arrangement, L/H is about 4.24; the choice of the gap size L, in addition to having a certain relationship with H, the desired luminous flux output is combined by the LED light source (1), the luminous flux is required by the projector, and the limitations of the projector lens (8) and LCD light valve (6) on the light-emitting area of the light source; combining the length and width dimensions, efficiency of the light-emitting chip (102), in the defined light-emitting area, the number of light-emitting chips (102) is arranged much; while the number of light-emitting chips (102) are arranged properly.

\* \* \* \* \*